(12) United States Patent
Ekman et al.

(10) Patent No.: US 7,702,875 B1
(45) Date of Patent: Apr. 20, 2010

(54) SYSTEM AND METHOD FOR MEMORY COMPRESSION

(75) Inventors: Magnus Ekman, Gothenburg (SE); Per O. Stenström, Gothenburg (SE)

(73) Assignee: Sun Microsystems, Inc., Santa Clara, CA (US)

( * ) Notice: Subject to any disclaimer, the term of this patent is extended or adjusted under 35 U.S.C. 154(b) by 187 days.

(21) Appl. No.: 11/222,725

(22) Filed: Sep. 9, 2005

Related U.S. Application Data

(60) Provisional application No. 60/629,208, filed on Nov. 18, 2004.

(51) Int. Cl.
*G06F 13/00* (2006.01)
*G06F 13/28* (2006.01)
*G06F 7/00* (2006.01)
*G06F 17/00* (2006.01)
*G06F 13/12* (2006.01)
*G06F 13/38* (2006.01)

(52) U.S. Cl. .......................... 711/170; 707/101; 710/68
(58) Field of Classification Search ................... 711/170
See application file for complete search history.

(56) References Cited

U.S. PATENT DOCUMENTS

| | | | |
|---|---|---|---|
| 5,627,995 A * | 5/1997 | Miller et al. | ................. 711/171 |
| 6,145,069 A * | 11/2000 | Dye | ........................... 711/170 |
| 6,532,012 B2 | 3/2003 | Deering | |
| 6,775,751 B2 * | 8/2004 | Tremaine | .................... 711/154 |
| 6,795,897 B2 * | 9/2004 | Benveniste et al. | .......... 711/118 |
| 6,816,942 B2 * | 11/2004 | Okada et al. | ................ 711/112 |
| 6,994,740 B2 * | 2/2006 | Gammack et al. | ............. 55/343 |

OTHER PUBLICATIONS

"IBM Memory Expansion Technology (MXT)", R. B. Tremaine, P. A. Franaszek, J. T. Robinson, C. O. Schulz, T. B. Smith, M. E. Wazlowski, P. M. Bland; IBM J. Res. & Dev. vol. 45 No. 2 Mar. 2001.*
"Design and Performance of a Main Memory Hardware Data Compressor", Morten Kjelso, Mark Gooch, Simon Jones; Electronic Systems Design Group, Loughborough University, Proceedings of EUROMICRO-22 IEEE 1996.*

(Continued)

*Primary Examiner*—Matt Kim
*Assistant Examiner*—Michael Alsip
(74) *Attorney, Agent, or Firm*—Rory D. Rankin; Meyertons Hood Kivlin Kowert & Goetzel, P.C.

(57) ABSTRACT

A computing system comprises a processor, a data storage unit, and a block size table (BST). The processor includes at least one cache configured to store data. The data storage unit is configured to store data in a compressed format in fixed size units. The BST is configured to store block size entries corresponding to data blocks stored in the data storage unit. In response to a miss in the cache corresponding to a target data block, the processor is configured to identify an entry in the BST corresponding to the target data block, utilize information stored in the entry to determine the location of the target data block in the data storage unit, and cause the target data block to be retrieved from the data storage unit, decompressed, and stored in the cache.

20 Claims, 15 Drawing Sheets

OTHER PUBLICATIONS

Microsoft Computer dictionary Fifth Edition, Microsoft press 2002 pp. 375 and 446-447.*

Bulent Abali, Hubertus Franke, Dan E. Poff, T. Basil Smith, Performance of Hardware Compressed Main Memory, IBM Research Report Computer-Science/Mathematics, Jul. 19, 2000, RC 21799 (98138), IBM Research Division, Almaden-Austin-Beijing-Haifa-T. J. Watson-Tokyo-Zurich.

Bulent Abali, Hubertus Franke, Xiaowei Shen, Dan E. Poff, T. Basil Smith, Performance of Hardware Compressed Main Memory, IBM T.J. Watson Research Center, P.O. Box 218, Yorktown Heights, NY 10598.

Alaa R. Alameldeen and David A. Wood, Frequent Pattern Compression: A Significance-Based Compression Scheme for L2 Caches, Technical Report 1500, Computer Sciences Dept., UW-Madison, Apr. 2004, Computer Sciences Department, University of Wisconsin-Madison.

Alaa R. Alameldeen and David A. Wood, Adaptive Cache Compression for High-Performance Processors, 31st Annual Internationals Symposium on Computer Architecture (ISCA-31), Munich, Germany, Jun. 19-23, 2004; Computer Sciences Department, University of Wisconsin-Madison.

* cited by examiner

SYSTEM AND METHOD FOR MEMORY COMPRESSION

CROSS REFERENCE TO RELATED APPLICATIONS

This application claims benefit of priority to U.S. Provisional Patent Application Ser. No. 60/629,208, filed on Nov. 18, 2004.

BACKGROUND OF THE INVENTION

1. Field of the Invention

The invention relates generally to computing systems and, more particularly, to a system and method for compression in a memory system.

2. Description of Related Art

Over the years, processor speeds have increased at a faster rate than that of memory. Consequently, the gap between the speed of the processor and memory has widened and memory access latencies are of increasing concern. While cache hierarchy research is ongoing, computer architects have generally addressed this speed gap problem by simply adding more memory resources. As a result this approach, the size of caches and the amount of main memory, particularly in server systems, has increased steadily over the last decades. Therefore, techniques that utilize memory resources more effectively are of increasing importance as they may reduce the cost and the space consumed by memory resources.

One approach to more effective use of memory resources involves utilizing compression. For example, lossless data compression techniques have been used to utilize main memory resources more effectively. To be effective, however, these methods operate on relatively large data chunks, typically in the range of page sizes. Consequently, such techniques may be less effective for compressing data at the granularity of typical cache block sizes. Another technique uses significance-based compression (SBC) algorithms for compression of data chunks in the range of typical cache block sizes. However, none of the above techniques is directed to the use of simple compression techniques on memory-level data

SUMMARY OF THE INVENTION

The problems outlined above may be solved by various embodiments of the invention described herein.

A main-memory compression scheme is contemplated which uses (i) a relatively simple compression scheme; (ii) an efficient structure for locating a compressed block in memory; and (iii) a hierarchical memory layout that allows compressibility of blocks to vary with a relatively low fragmentation overhead.

In one embodiment, a computing system comprises a processor, a data storage unit, and a block size table (BST). The processor includes at least one cache configured to store data. The data storage unit is configured to store data in a compressed format in fixed size units. The BST is configured to store a plurality of block size entries corresponding to one or more data blocks stored in the data storage unit. In response to a miss in the cache corresponding to a target data block, the processor is configured to identify a first entry in the BST corresponding to the target data block, utilize information stored in the first entry to determine the location of the target data block in the data storage unit, and cause the target data block to be retrieved from the data storage unit, decompressed, and stored in the cache. In identifying the first entry in the BST, the processor may also be configured to identify a target page that includes the target data block and identify a BST entry which corresponds to the target page.

In a further embodiment, a compression/decompression unit is configured to compress data to be stored in the data storage unit and decompress data to be stored in the cache.

In a still further embodiment, each entry of the BST comprises one or more block size values. To determine the location in the data storage unit of the target data block, a size vector comprising a mapping of block size values to block sizes is retrieved from the first entry. The size vector is used to determine an aggregate size of data blocks from a first block in the target page to a block immediately preceding the target data block, which, when added to the base address of the target page yields the location of the target data block.

DETAILED DESCRIPTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein.

Figure 1:
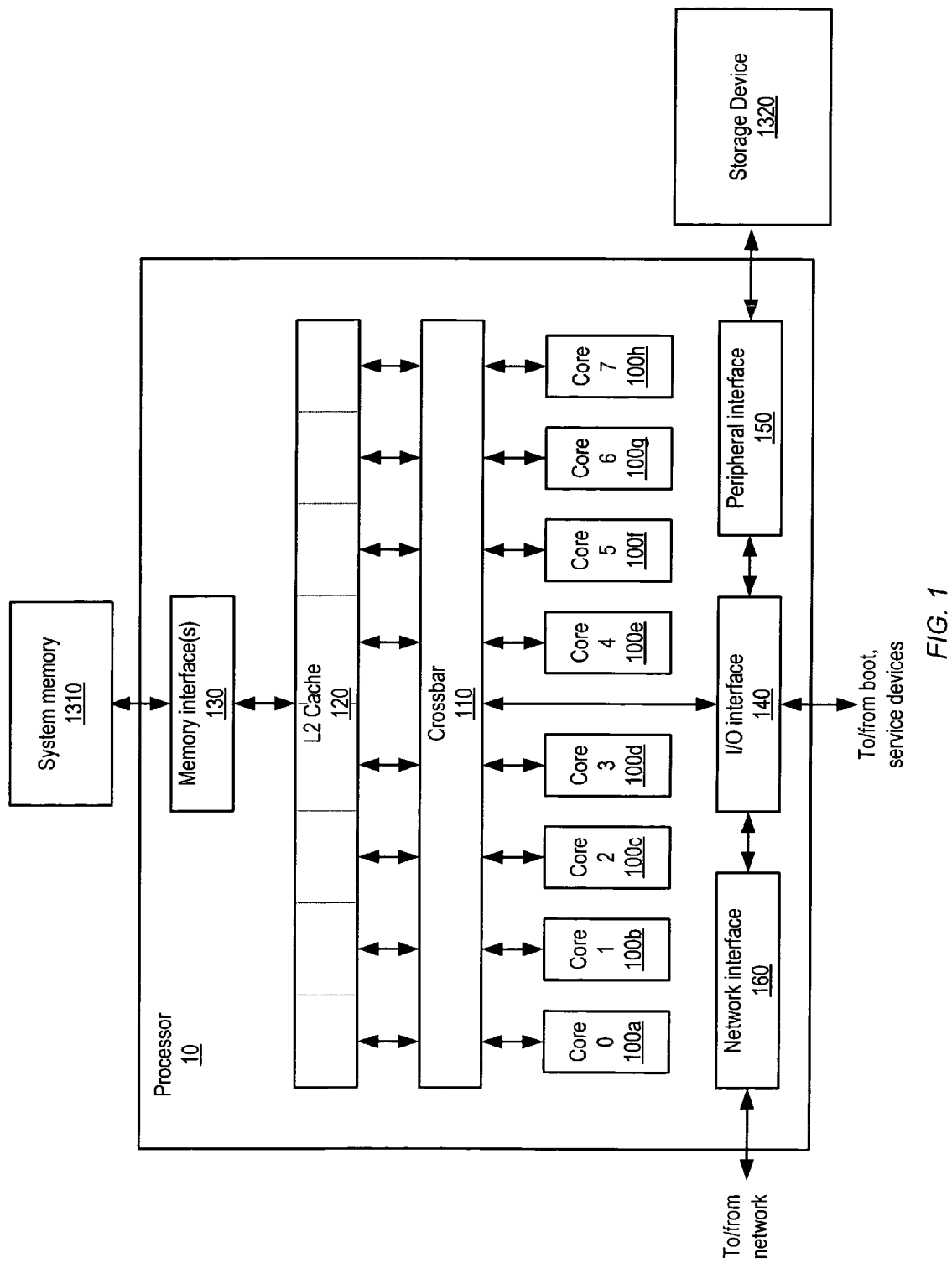
FIG. 1 is a block diagram illustrating one embodiment of a multi-threaded multi-core processor.

A block diagram illustrating one embodiment of a multi-threaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory 1310. Additionally, crossbar 110 couples cores 100 to input/output (I/O) interface 140, which is in turn coupled to a peripheral interface 150 and a network interface 160. As described in greater detail below, I/O interface 140, peripheral interface 150 coupled to a storage device 1320, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Figure 2:
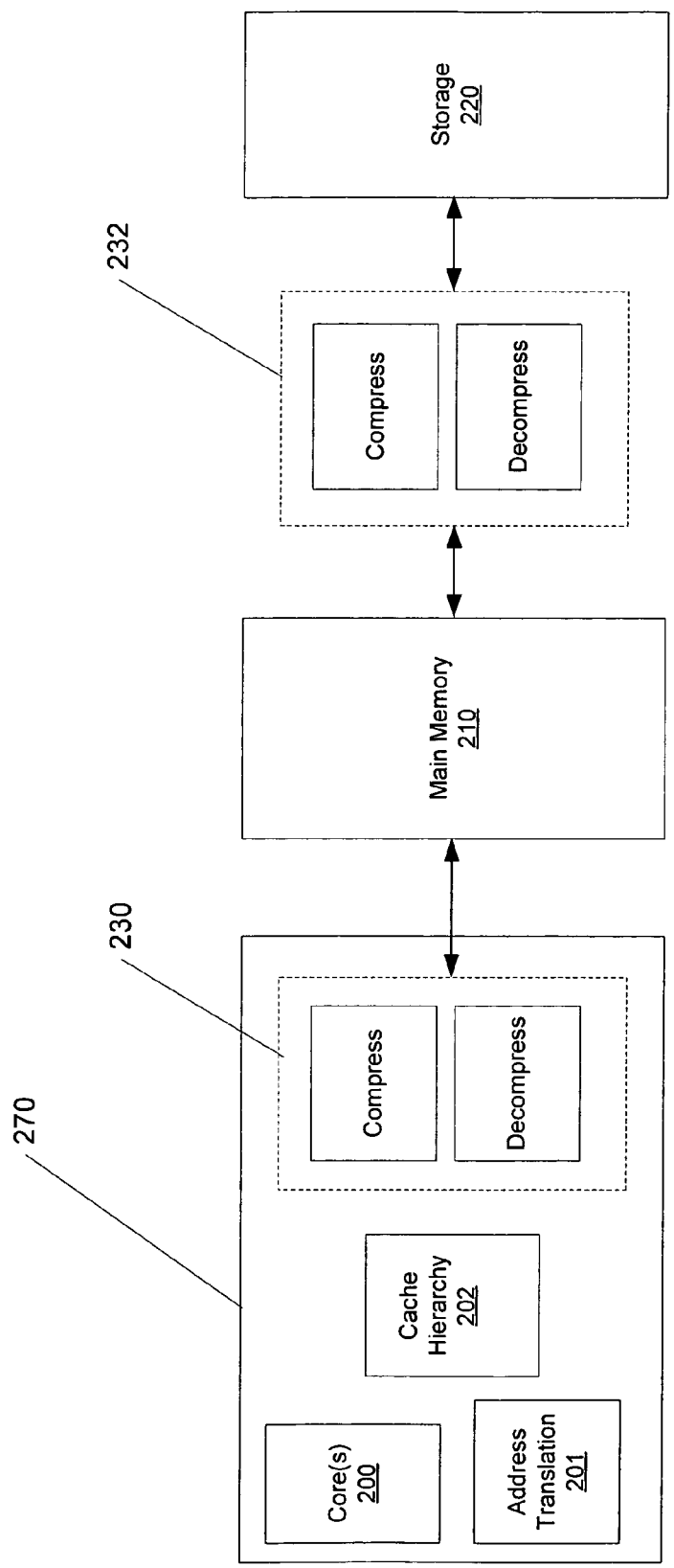
FIG. 2 depicts one embodiment of a system configured to use compressed data in main memory.

In one embodiment, a main memory may be configured to store data in a compressed format. FIG. 2 provides an overview of a system that is configured to variously utilize compression and decompression in the storage of data. FIG. 2 depicts a processor 270 coupled to a main memory 210, which is in turn coupled to non-volatile storage 220. Non-volatile storage may comprise a disk or any other suitable storage device. Processor 270 includes one or more cores 200 and a cache hierarchy 202, and an address translation unit 201. Also illustrated in FIG. 2 are components 230 and 232 (hardware and/or software), which are configured to compress and decompress data.

In one embodiment, data stored within main memory 210 is stored in a compressed format. When data is retrieved from storage 220, the data is compressed by compression/decompression unit 232 prior to being stored within main memory 220. Data which is retrieved by processor 270 from main memory 210 is decompressed by compression/decompression unit 230 prior to being stored within the cache hierarchy, 202. In one embodiment, each data block may correspond to a cache line. Alternatively, in other embodiments, each data block may correspond to any number of cache lines and/or any number of bytes of data. To simplify the following discussion, it may be assumed without limitation that each data block corresponds to one cache line. Also, depending on the compression algorithm used in this and other embodiments, compressed data blocks stored in main memory 210 may be one of a number of fixed sizes. Further, compressed blocks may grow. In one embodiment, the growth of a particular block may necessitate moving data blocks stored within memory 210. Compaction processes may also be utilized to use available space within main memory 210 more efficiently. In one embodiment, address translation unit 201 is configured to identify the location of blocks within main memory 210 and may further identify the sizes of blocks stored in main memory 210. In one embodiment, processor 270 may further include a translation lookaside buffer (TLB), and the address translation unit 201 may include one entry for each entry of the TLB.

Figure 3:
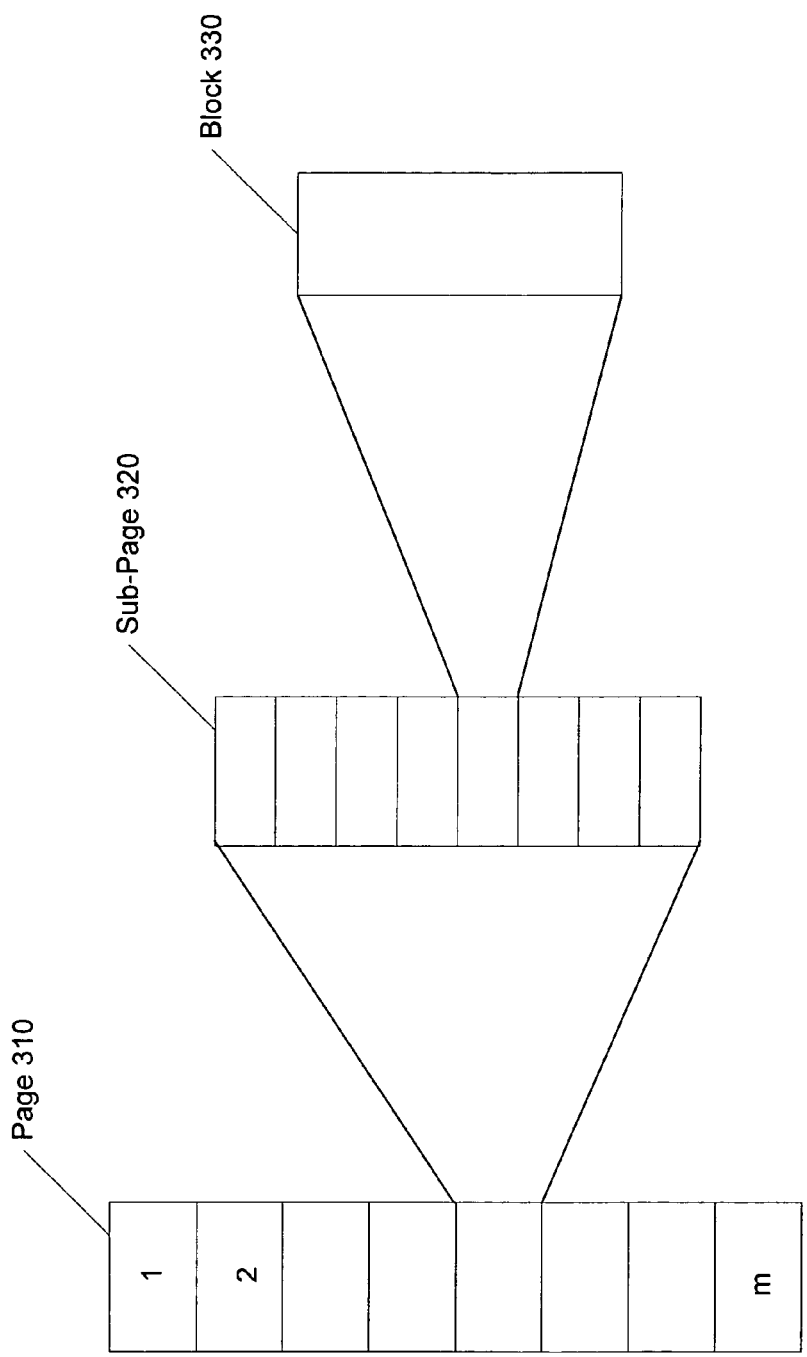
FIG. 3 is a block diagram illustrating one embodiment of a hierarchical paging architecture for data stored in main memory.

FIG. 3 illustrates one embodiment of a hierarchical paging architecture for data stored in main memory 210. Main memory 210 may be divided into a number of pages such as page 310. In addition, main memory 210 may be sub-divided in a hierarchical manner. More specifically, each page may be divided into a number of sub-pages, such as sub-page 320. Each sub-page may be divided into a number of blocks, such as block 330. In the illustrated embodiment, page 310 comprises m sub-pages, each of which may be one of a number of fixed sizes that may be referred to as sub-page thresholds. Similarly, each sub-page may comprise a number of blocks, each of which may be one of n fixed sizes that may be referred to as block thresholds. Similarly, pages may be one of a number of fixed sizes that may be referred to as page thresholds.

In an alternative embodiment, the page hierarchy may be flattened such that a page comprises a number of blocks without sub-pages. In various embodiments, each block may comprise a single cache line, a portion of a cache line, or more than a single cache line.

In one embodiment, data may be stored on disk in an uncompressed format. Accordingly, data that is brought in from disk may be compressed so that the entire main memory 210 is compressed. In an alternative embodiment, data may be stored both on disk and in main memory in a compressed format. Each block may be compressed individually to one of a selection of block thresholds associated with a given one of a number of compression algorithms as described below. Individual block thresholds may be denoted t0, t1, . . . tn. In one embodiment, the first and the last block thresholds are special in that t0 may correspond to a block containing only zeroes and tn may correspond to an uncompressed block.

Decompression of a memory block may be triggered by a miss in the cache hierarchy between an uncompressed level and a compressed level, or between the lowest level and main memory. Without loss of generality, it will be assumed in the following discussion that decompression is triggered by a miss in the lowest level of the cache hierarchy. A cache miss may cause a block eviction and if the evicted cache block is dirty it may be compressed before it is written back to memory. If the size of the dirty block has passed a block threshold, the block may be assigned a new block threshold. Consecutive blocks in the address space may be moved to make room for the block in the case the block size increases, denoted a block overflow, or to fill up the empty space in the case the block size decreases, denoted a block underflow.

To reduce the number of occasions when blocks are relocated, a small hysteresis, hn, is introduced for each threshold. So, for example, if a block overflow occurs causing the affected block's size to exceed the nth block threshold, the affected block's size may not be relocated due to a subsequent underflow unless the size has changed to be more than hn bytes smaller than the nth block threshold. Thus, a block can grow slightly without overflowing and once it has overflowed its size may be reduced hn bytes before a new relocation is performed.

Further, the division of pages into sub-pages may reduce the amount of data that is relocated in response to an underflow or an overflow. Assuming such a hierarchy, only the blocks located after the affected block within the sub-page are relocated on a block overflow/underflow. In addition, hystereses may be used at each level of the page hierarchy to reduce the number of sub-page and page overflows/underflows.

Figure 4:
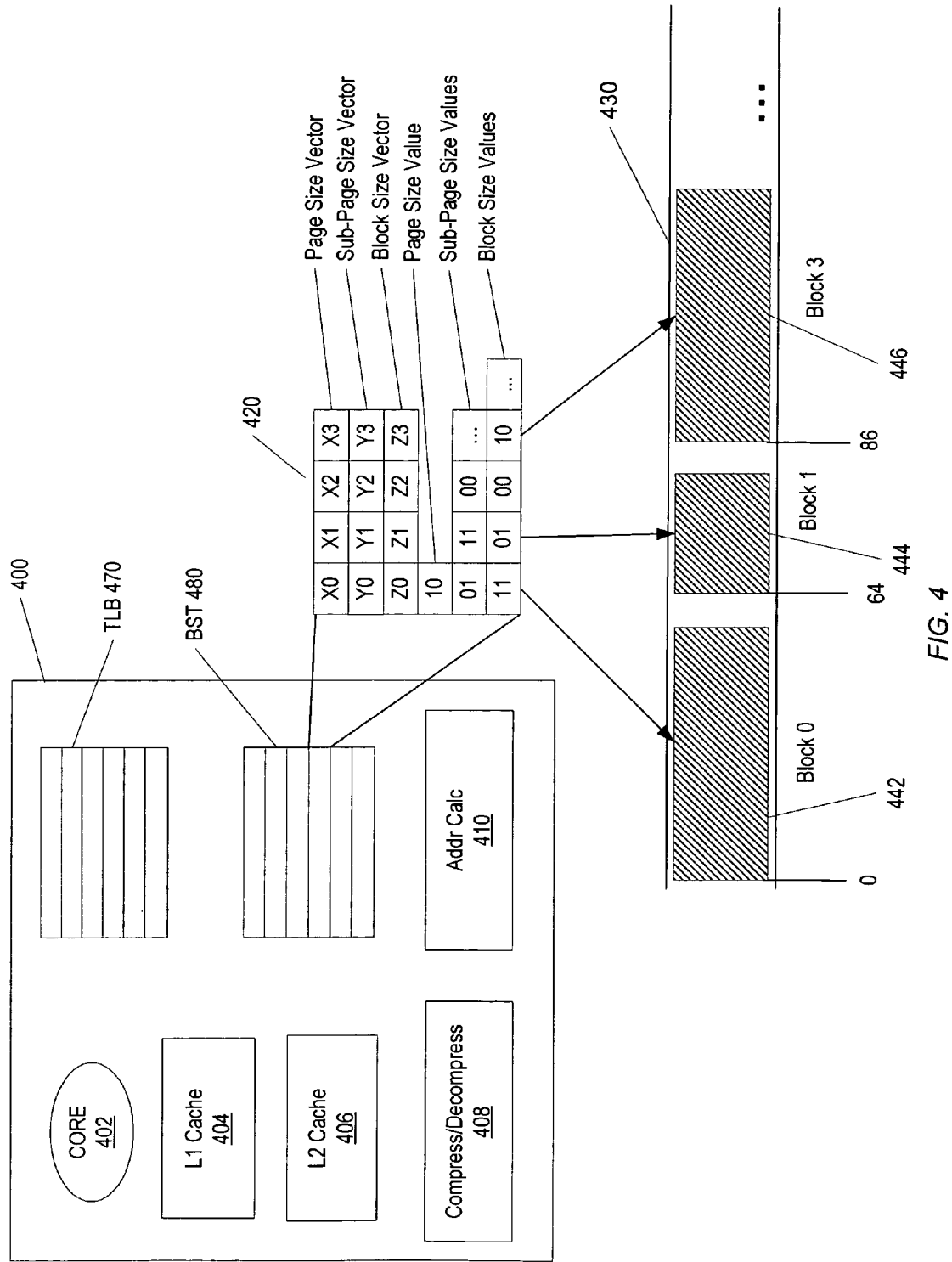
FIG. 4 illustrates one embodiment of hardware structures of a processor that supports a compressed memory system.

FIG. 4 illustrates one embodiment of hardware structures of a processor 400 that supports a compressed memory system. In the illustrated embodiment, a processor 400 includes a core 402, a L1 cache 404, a L2 cache 406, a compression/decompression module 408, an address calculator 410, a TLB 470, and a block size table (BST) 480. BST 480 includes a cache of entries such as entry 420. Each BST entry includes a series of cached block size values, sub-page size values, a size value for the corresponding page, a block size vector, a sub-page size vector, and a page vector. The block size vector contains data indicating the size of the block thresholds that may be used on the corresponding page. The sub-page size vector contains data indicating the size of the sub-page thresholds that may be used on the corresponding page. The page size vector contains data indicating the size of the page thresholds that may be used throughout the memory compression system. Accordingly, each BST entry includes data indicative of the organizational structure of a given page. For example, entry 420 includes data corresponding to a page 430, further details of which are illustrated in the lower portion of FIG. 4. Page 430 comprises blocks 442, 444, 446, etc. The relationships among the values stored in a BST entry and memory blocks in the corresponding page are described below.

In the event of a cache miss, the process for locating the targeted memory block may, in one embodiment, include retrieving the block size information from BST 480, which may be a hardware structure on the processor chip. In an alternative embodiment, BST 480 may be located in a structure (e.g., a memory controller) external to the processor. BST 480 may have one entry for each entry in TLB 470 and may be filled on TLB-misses by the TLB-miss handler. Each entry in the BST may contain information about the size of every block and every sub-page on a given page as well as the page size. Assuming that there are n block sizes, j sub-page sizes, and k page sizes, each entry in BST 480 consists of $\log_2$ n bits for each block, $\log_2$ j bits for each sub-page, and $\log_2$ k bits for the page itself. Accordingly, the total number of size bits for each entry may be expressed algebraically as (PAGE_SIZE/BLOCK_SIZE*$\log_2$ n)+(m$\log_2$ j)+$\log_2$ k, where m is the number of sub-pages in a page. For example, assuming a page size of 8 KB, eight sub-pages, four block sizes, four sub-page sizes, four page sizes, and an uncompressed cache block size of 64 bytes, the size values of each entry consists of 34.25 bytes. A TLB-entry that contains one physical and one virtual address is typically 16 bytes in a 64-bit system, and hence BST 480 is about twice the size of TLB 470.

In one embodiment, one of the block thresholds may be used to designate a block containing all zeros and may generally correspond to a block size of zero. If a block containing only zeroes is requested and the BST 480 is located on chip, the memory request may be immediately satisfied on the chip since the size vector contains all the information needed to satisfy that block request. Thus, in the case of a load instruction, a zero may be immediately returned and the load instruction may be completed rapidly. The corresponding cache block may then be cleared in the background, in parallel without having to transfer the block from memory.

In the example illustrated in FIG. 4, the number of block thresholds (n) is four and they may be encoded with $\log_2$ n bits. The actual threshold values may be kept as a bit vector called "block size vector" in the BST entry and in the page table together with the address translation. In the illustrated embodiment, the elements of the block size vector are designated as Z0, Z1, Z2, and Z3. Accordingly, the block sizes can be encoded with two bits as the values 00, 01, 10 and 11 that represent the block sizes stored in elements Z0-Z3. For example, in the illustrated embodiment, the values of Z0-Z3 may be set to 0, 22, 44, and 64 bytes respectively assuming that 00 denotes a block with only zeroes, and 11 denotes an uncompressed block. The size of each sub-page, as well as the size of the page itself could be calculated from these bits, but to simplify the address translation process and the process of determining if an underflow or an overflow has occurred, the BST entry may also contain the threshold values for the sub-pages and the page stored in bit vectors called "sub-page size vector" and "page size vector", respectively. In the example illustrated in FIG. 4, the number of sub-page thresholds (j) is four and they are designated as Y0, Y1, Y2, and Y3. In addition, the number of page thresholds (k) is four and they are designated as X0, X1, X2, and X3. Values of Y0-Y3 and X0-X3 may be determined in a manner similar to that of block size vector elements Z0-Z3. For example, in one embodiment Y0 may denote a sub-page of all zeroes, Y3 may denote an uncompressed sub-page, X0 may denote a page of all zeroes, and X3 may denote an uncompressed page. Y1, Y2, X1, and X2 may be set to values that represent varying degrees of compression within the sub-page and page, depending on the compression algorithm that is used. For example, Y1 and Y2 may be evenly spaced between the values of Y0 and Y3 and X1 and X2 may be evenly spaced between the values of X0 and X3.

The lower part of FIG. 4 shows the beginning of a page in memory, memory region 430, including three blocks. The corresponding BST entry 420 holding the block size values (11 01 00 10 . . . ), sub-page size values (01 11 00 . . . ), and page size value (10) is shown in the center of FIG. 4. The compressed size of block 442 (block 0) is between 44 and 64 bytes and hence is assigned size 64 (corresponding to a block size value of 11). Block 444 (block 1) begins at memory location 64 and has a compressed size of less than 22 bytes. Accordingly, block 444 is assigned the size 22 (corresponding to a block size value of 01). Block 2 (not shown) only contains zeroes and since a block size value of size 00 is reserved for zeroes, this block does not have to be stored in memory at all, given that the corresponding size vector may be stored with the address translation. Thus, block 444 (block 1) is followed by block 446 (block 3) beginning at memory location 86, whose compressed size is between 22 and 44 bytes. Accordingly, block 446 is assigned a size of 44 bytes (corresponding to a block size value of 10).

As mentioned above, the BST entry also contains the encoded sizes of the sub-pages in the page (01 11 00 . . . ). To locate the address of a compressed block, the offset within the page must first be determined. This may be done in address calculator 410 by adding the sizes of the sub-pages prior to the sub-page containing the target block and the sizes of the blocks located prior to the target block in the same sub-page. To be able to do this, in one embodiment, address calculator 410 may utilize the block thresholds and sub-page thresholds that are stored in the block size vector and sub-page size vector respectively. Once address calculator 410 has located the target block, it may be retrieved and decompressed by compress/decompress module 408.

In the embodiment illustrated in FIG. 4, compress/decompress module 408 is shown as part of processor 400. In an alternative embodiment, compress/decompress module 408 may be separate from processor 400. For example, compress/decompress module 408 may be part of a separate memory controller or other suitable memory interface unit outside of processor 400.

Figure 5:
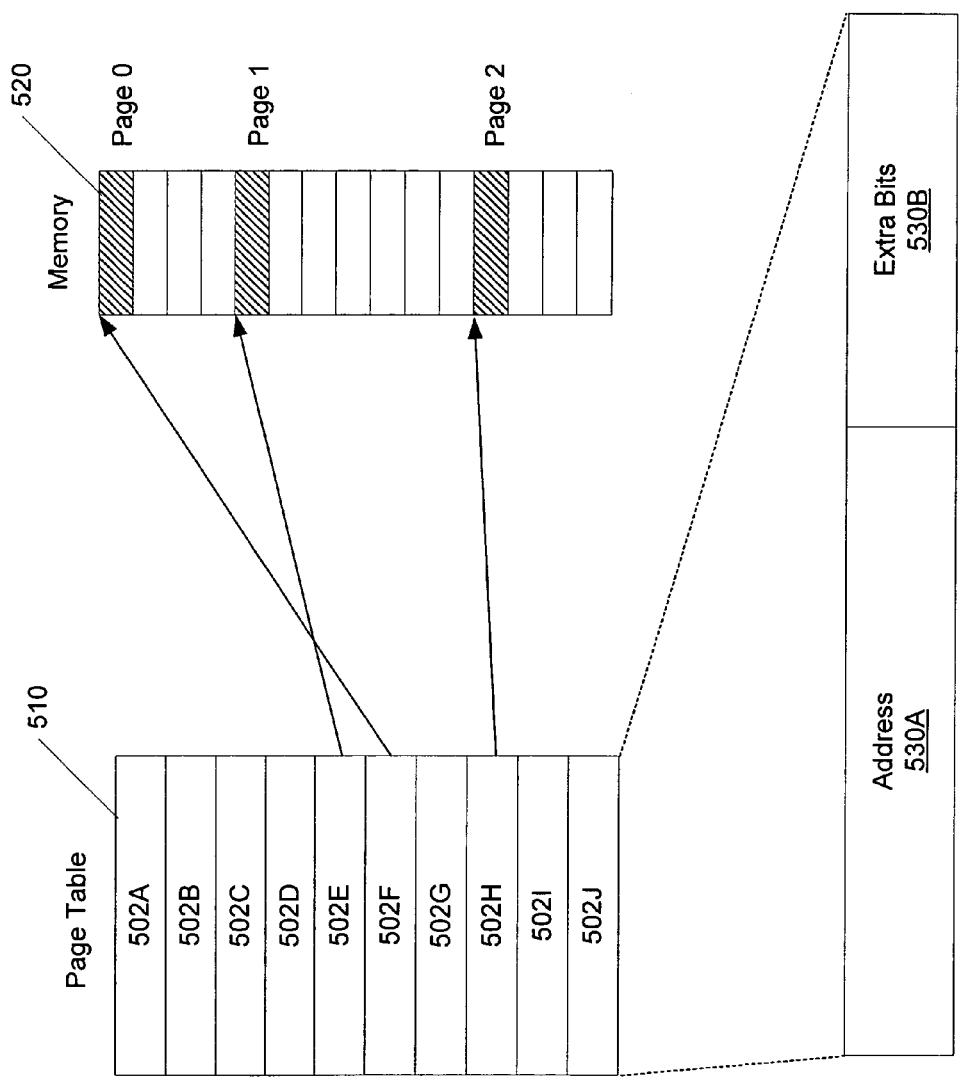
FIG. 5 illustrates one embodiment of the software structures of a page table of a system that supports a compressed main memory.

FIG. 5 illustrates one embodiment of the software structures of a page table 510 of a system that supports a compressed main memory 210. Page table 510 includes entries 502, several of which are shown as entries 502A-502J. Each entry 502 corresponds to a particular memory page of memory 520. For example, as shown, entry 502F corresponds to page 0, entry 502E corresponds to page 1, and entry 502I1 corresponds to page 2. In one embodiment, each entry 502 also includes an address 530A and extra bits 530B. Address 530A corresponds to the base address of a page. Extra bits 530B include bits reserved to specify larger size addresses corresponding to smaller page sizes. Extra bits 530B also include page, sub-page, and block size vectors that map page size values to page sizes, sub-page size values to sub-page sizes, and block size values to block sizes for the corresponding page.

Figure 6:
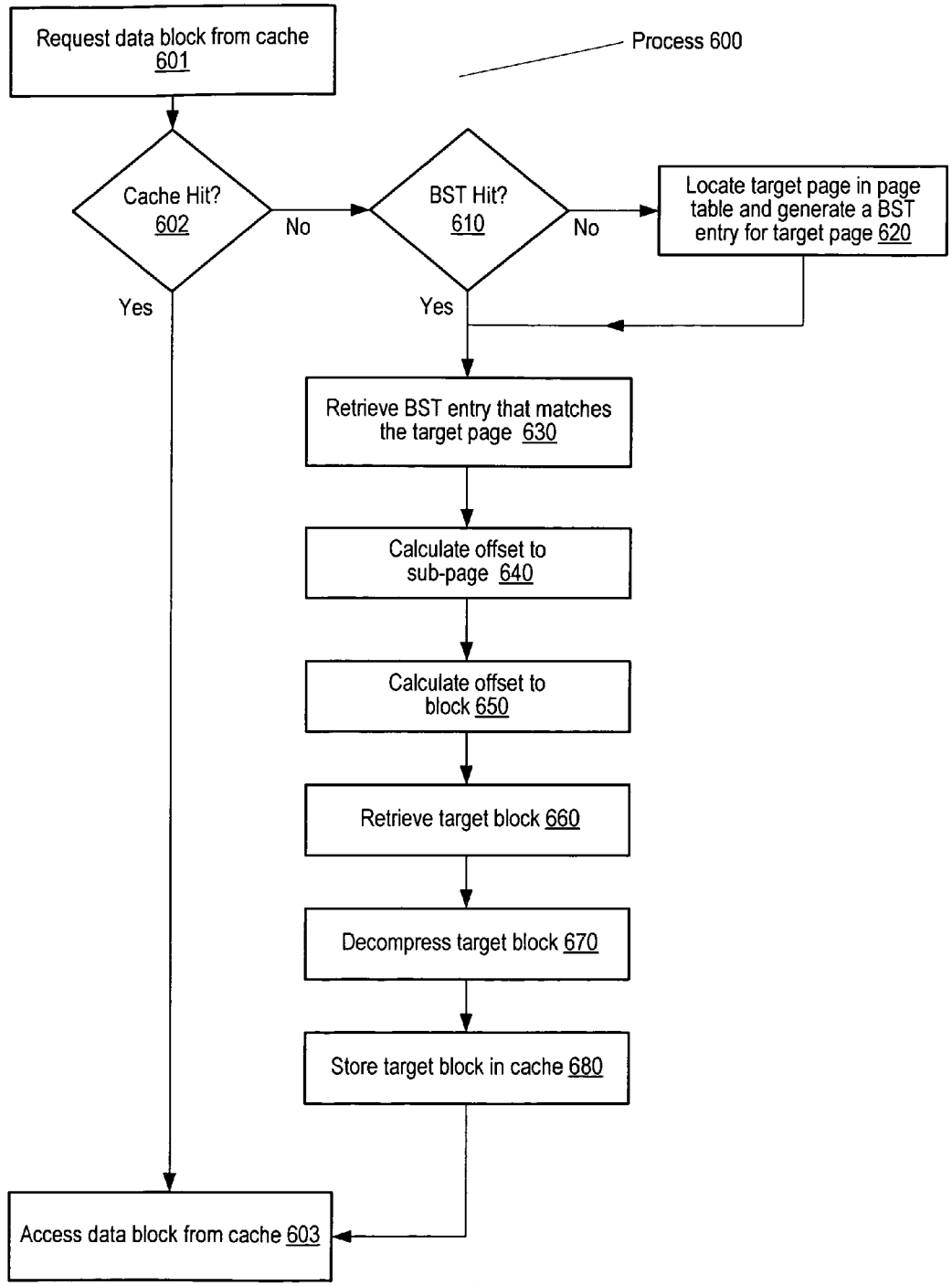
FIG. 6 illustrates one embodiment of a process that may be used to access a data block.

FIG. 6 illustrates one embodiment of a process 600 that may be used to access a data block. Process 600 begins when a request is made to access a data block from the cache (601). If the target data block is located in the cache, i.e., a cache hit occurs (decision block 602), then the access may be completed from the copy of the data block stored in the cache (603). Conversely, if a cache miss occurs (decision block 602), then a valid copy of the target data block may be stored elsewhere.

In order to locate the target block, the base address of the target page containing the target block may be used to locate the corresponding BST entry of the target page. If there is not a cached entry in the BST corresponding to the target page (610), the page may be located by consulting the page table and a new BST entry may be generated (620). Once the BST entry of the target page has been located or generated, it may be retrieved (630). The retrieved entry contains sub-page size values, block size values, a sub-page size vector and a block size vector corresponding to the target page and sub-page that may be used for address calculation. Address calculation may begin with the calculation of the offset to the target sub-page (640). Upon completion of the calculation of the offset location of the target sub-page, the calculation of the offset to the target block may begin (650). Combining the base address of the target page, the target sub-page offset, and the target block offset yields the location of the target block. Once the target block location has been calculated, the target block may be retrieved (660), decompressed (670), and stored in the cache (680).

Figure 7:
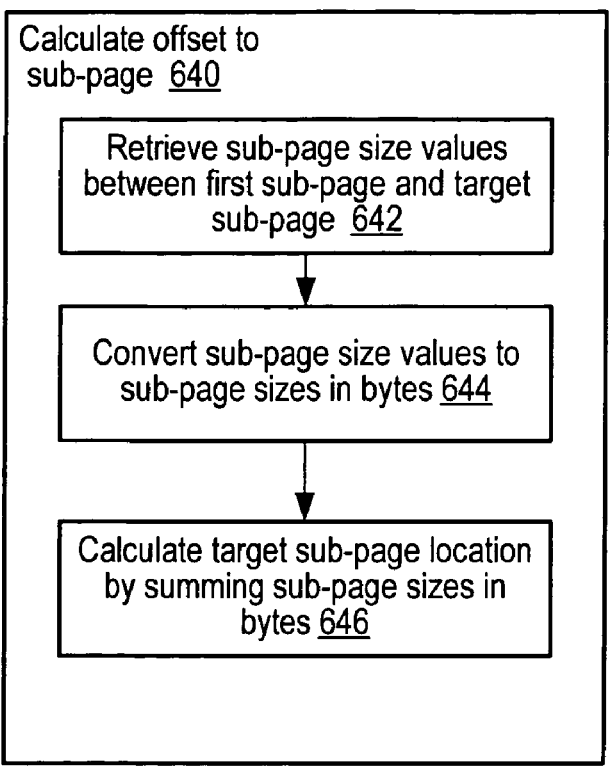
FIG. 7 illustrates one embodiment of a process for calculating the offset to a target sub-page.

FIG. 7 illustrates one embodiment of a process 640 for calculating the offset to a target sub-page. In the illustrated embodiment, process 640 may include three steps (642, 644, and 646). In order to find the offset to the target sub-page, the size values of each sub-page between the beginning of the page and the target sub-page may be retrieved from the BST (642). Next, the resulting sub-page size values may be converted to sub-page sizes in bytes by consulting the size vector retrieved previously (630). After the sub-page sizes have been determined, they may be summed to calculate the offset location of the target sub-page in bytes (646).

Figure 8:
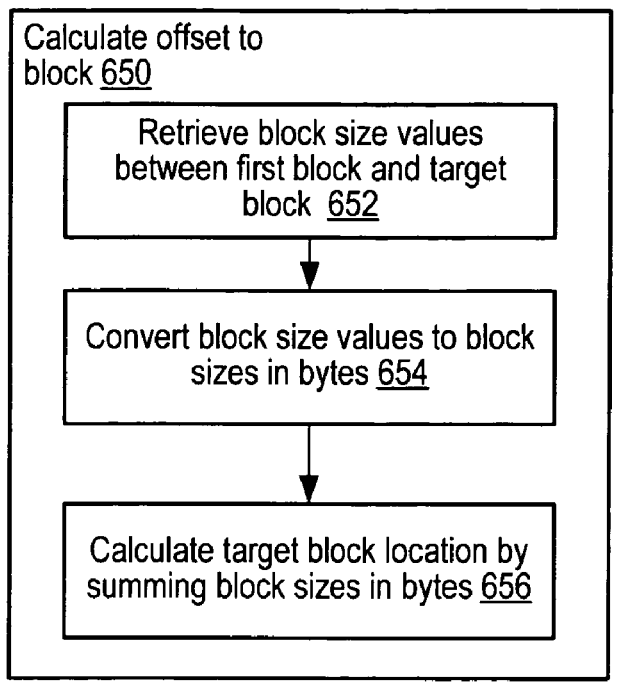
FIG. 8 illustrates one embodiment of a process for calculating the offset to a target block.

FIG. 8 illustrates one embodiment of a process 650 for calculating the offset to a target block. In the illustrated embodiment, process 650 may include three steps (652, 654, and 656). In order to find the offset to the target block, the size values of each block between the beginning of the sub-page and the target block may be retrieved from the BST (652). Next, the resulting block size values may be converted to block sizes in bytes by consulting the block size vector retrieved previously (630). After the block sizes have been determined, they may be summed to calculate the offset location of the target block in bytes (656). The target block may then be retrieved at the location indicated by the sum of the target page base address, the offset to the target sub-page, and the offset to the target block (660).

Figure 9:
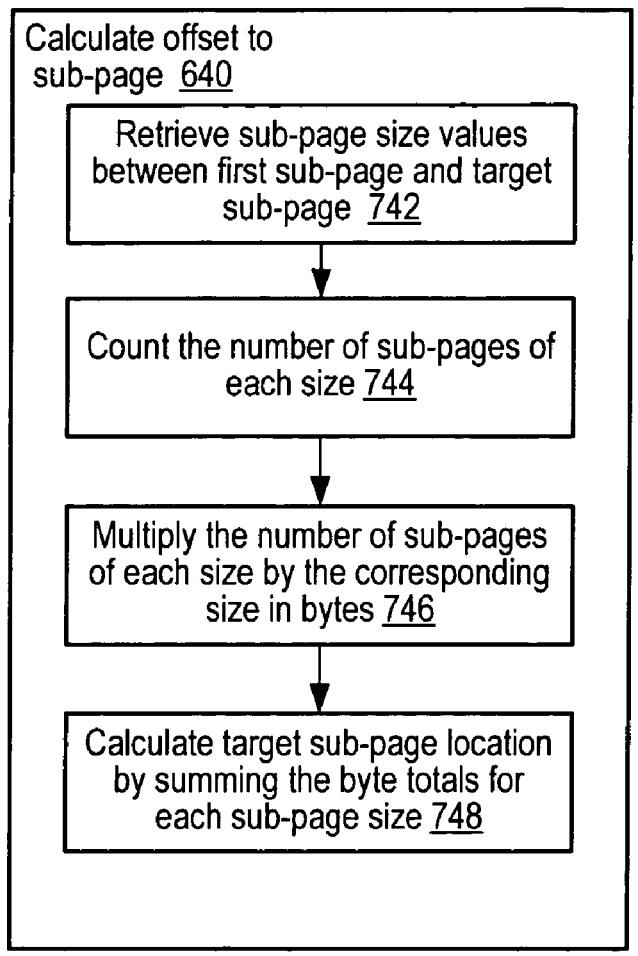
FIG. 9 illustrates an alternative embodiment of a process for calculating the offset to a target sub-page.

FIG. 9 illustrates an alternative embodiment of process 640 for calculating the offset to a target sub-page. As shown, the address may be calculated by first retrieving the sub-page size values between the first sub-page and the target sub-page (742). Next, the number of sub-pages for each of the j sub-page sizes may be counted (744). The resulting counts may then be multiplied by the corresponding size in bytes (746). Upon completion of the multiplications, the target sub-page location may be calculated by summing the byte totals for each sub-page size (block 748).

Figure 10:
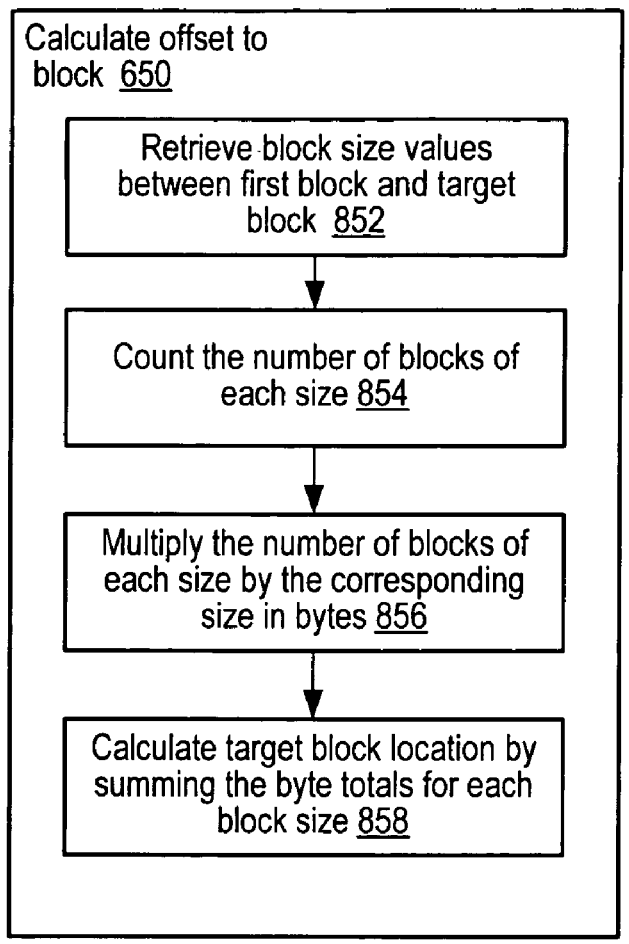
FIG. 10 illustrates an alternative embodiment of a process for calculating the offset to a target block.

FIG. 10 illustrates an alternative embodiment of process 650 for calculating the offset to a target block. As shown, the address may be calculated by first retrieving the block size values between the first block and the target block (852). Next, the number of blocks for each of the n block sizes may be counted (854). The resulting counts may then be multiplied by the corresponding size in bytes (856). Upon completion of the multiplications, the target block location may be calculated by summing the byte totals for each block size (858).

Address calculator 410 may, in the worst case, add $m^{-1}$ sub-page sizes and PAGE_SIZE/(m*BLOCK_SIZE)−1 block sizes. Assuming a page size of 8 kilobytes, a block size of 64 bytes, and eight sub-pages for each page, this yields an addition of at most 22 small integers of between 6-10 bits.

Figure 11:
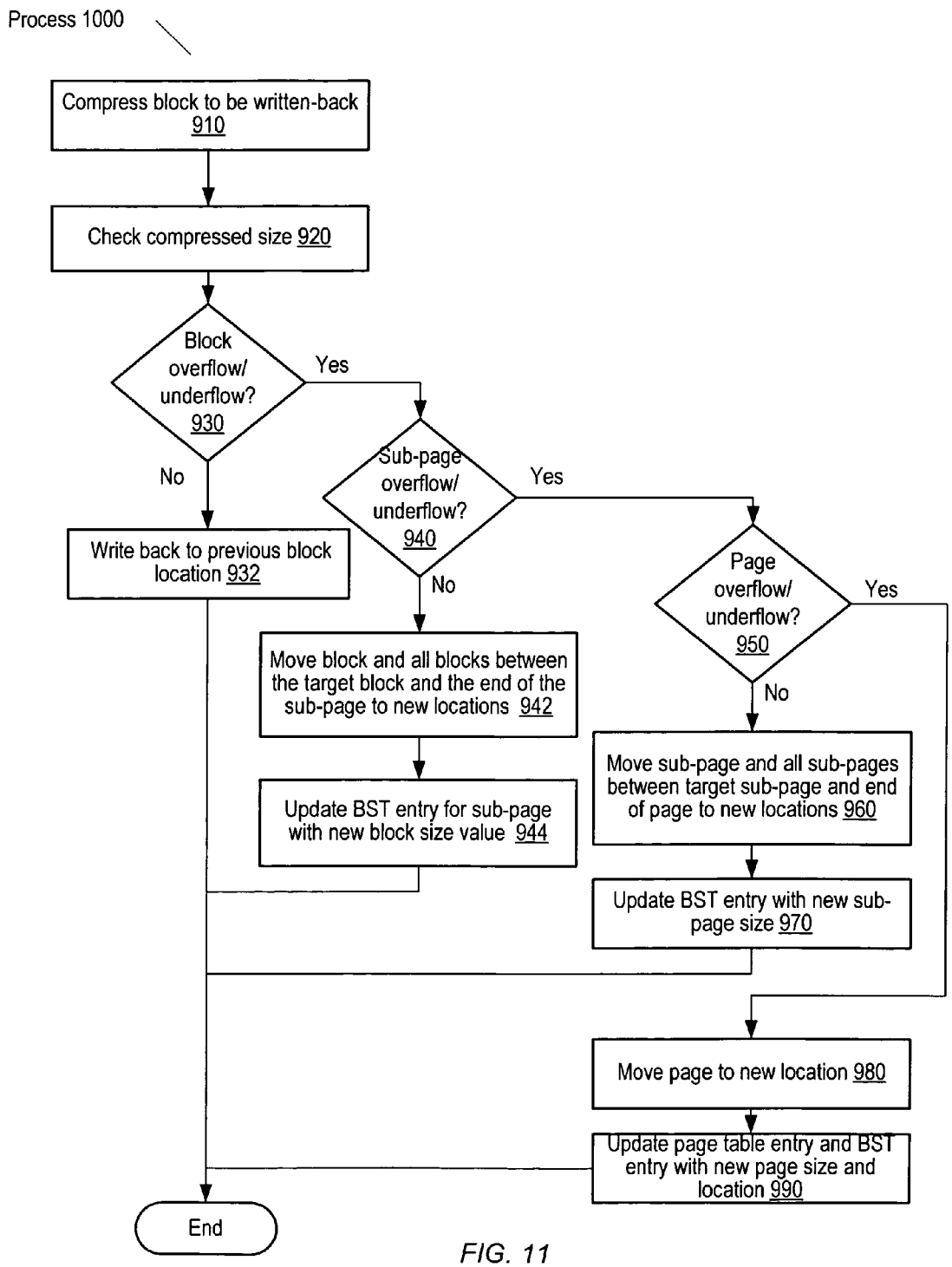
FIG. 11 illustrates one embodiment of a process that may be used to write back a block to compressed memory.

FIG. 11 illustrates one embodiment of a process 1000 that may be used to write back a block to compressed memory. On a write-back, the block is first compressed (910). Once the compression has been completed, the size of the block is checked against the bits in the size vector (920). If the block size has not changed (decision block 930), the block may be written back to its previous location (932). If a block overflow or underflow occurs, the new block sizes are summed to determine if a sub-page overflow or underflow has occurred (decision block 940). If there is not a sub-page overflow or underflow, data in the target block and any blocks between the target block and the end of the target sub-page may be moved. In one embodiment, the block moves may be performed under the control of a DMA engine. In a further embodiment, the DMA engine may be implemented off-processor and operate in the background so that the processor's execution of other instructions is not interrupted (942). In a still further embodiment, the DMA-engine may use cycle-stealing and may not exclude the processor from accessing memory that is not on the target sub-page. When the block moves are complete, the BST entry for the sub-page may be updated to reflect the new block sizes (944).

If a sub-page overflow or underflow occurs, the new sub-page sizes are summed to determine if a page overflow or underflow has occurred (decision block 950). If there is not a page overflow or underflow, data in the target block and any blocks between the target block and the end of the target sub-page, as well as data in any sub-pages between the target sub-page and the end of the target page may be moved (960). In one embodiment, the sub-page moves may be performed under the control of the DMA-engine as previously described for moving blocks. When the sub-page moves are complete, the BST entry for the sub-pages may be updated to reflect the new sub-page sizes (970).

If a page overflow or underflow occurs, the target page may be moved (980). In one embodiment, the page move may be performed under the control of the DMA-engine. The location of a free page may be obtained from a virtual memory manager. When the page move is complete the BST and page table entries may be updated with the new page size and location (990).

In one embodiment, the virtual memory manager may maintain a single pool of free pages. In an alternative embodiment, the virtual memory manager may maintain one pool for each of the compressed page sizes. On a page fault, the page may be read from disk, compressed, and assigned a page size. The size vectors may also be created at this point and inserted into the page table. Also, if the page table entry is not updated on each overflow/underflow, the TLB-miss handler may write back the evicted BST entry on a TLB miss so the page table contains the correct size vectors.

In one embodiment, one or more processors are fabricated on a single chip (such as a single processor or a chip multi-processor (CMP)) and a single BST on the same chip is sufficient. However, in alternative embodiments incorporating processors on multiple chips, more than one BST may be employed. In such cases, maintaining consistency of multiple BSTs is an issue analogous to the well-known issue of maintaining consistency of multiple TLBs. The main difference compared with TLB consistency is that TLB consistency is typically handled in software, since the entries will only change when a page mapping is changed. For the BST, entries need to be altered more frequently due to block and sub-page overflows/underflows. Consequently, in one embodiment, BST entries may be modified in hardware after the DMA-engine has moved data to reflect the new sizes of the blocks and sub-pages.

In a system with several BSTs, all copies of a changing entry may need to be modified or invalidated. The same holds for entries in the page table. A protocol similar to that of an ordinary cache coherence protocol may be employed. Events that require BST data sharing, BST data invalidation, or page table invalidation may be expected to be infrequent given the trend toward increasing numbers of threads on each processor chip. Accordingly, in one embodiment, the BST consistency protocol may be selected to match the most common cache coherence protocol, write-invalidate.

Various block threshold values may be selected, depending on a number of factors including the expected applications to be executed by the processors, memory system performance requirements, etc. In one embodiment, the thresholds may be selected to optimize performance based on a single measurement of the block sizes that exist for a given set of applications. Alternatively, the mean value of block sizes over an extended period of operation may be measured and used to select block threshold sizes. In further alternative embodiments, thresholds may be selected to be distributed at equal intervals between zero and the uncompressed block size, with or without including a zero-size threshold. In still further embodiments, individual block and sub-page thresholds may be selected for a benchmark application, while a global page threshold is used. Such thresholds could be used in a system where the thresholds can be included in an application binary after the application is profiled. In a still further embodiment, a set of thresholds consists of individual block and sub-page thresholds for each page in each benchmark. In that case, thresholds for each page may be adjusted during run time of an application.

As described above, each entry in the BST includes $\log_2 n$ bits for each cache block in the corresponding page plus additional bits for sub-pages, the page itself, and size vectors. If the page size supported in the system is large, each entry includes (PAGESIZE/BLOCKSIZE)*$\log_2 n$ bits for block size values alone, which may become prohibitively large. For example, in a system with a block size of 64 bytes, supporting 4 MB pages and four block thresholds, each entry would be more than 16 Kbyte. An alternative implementation that results in smaller BST entries is described below.

In an alternative implementation, the number of bits in each entry of BST 480 may be reduced by using the size bits to encode the sizes of q contiguous cache blocks called a block cluster. This way the number of block size values in a BST entry can be kept arbitrarily small. For example, setting q to 512, the overhead of handling 4 MB pages will be the same as handling 8K pages with q set to 1. Within a block cluster, since all blocks share bits that encode the size, all blocks may be assigned the same size as the largest block in the cluster. In this implementation, if contiguous blocks express about the same compressibility, the number of block size values in each entry may remain small. However, if most of the blocks can be compressed to a high degree while a few blocks cannot be compressed at all, these few blocks (hereinafter referred to as deviant blocks) may reduce the effectiveness of the compression system.

In a further embodiment, a prediction algorithm may be implemented to compensate for the effect of deviant blocks. For example, a number r of deviant blocks may be allowed per block cluster. Rather than setting the cluster size to the largest block in the cluster, the cluster size may be set to the (r−1)th largest block in the cluster. The deviant blocks may each occupy space that is a multiple of the size assigned to the other blocks. When a block within a block cluster is to be found it may be first assumed that there are no deviant blocks. Multiplying the target block number within the block cluster by the assigned size may predict the location of the target block. However, since it is not certain that the block actually is placed at that location since there might be a deviant block before that location in the cluster that has displaced the other blocks slightly, a technique for verifying the location may be employed. In one embodiment block location may be verified by storing a header together with each block that identifies the block's number within the cluster. In the common case, when there are no deviant blocks, the correct block may be loaded. In the event that the correct block is not found at the first try, the difference between the target block and the fetched block may be calculated and added to the address for the second try.

Figure 12:
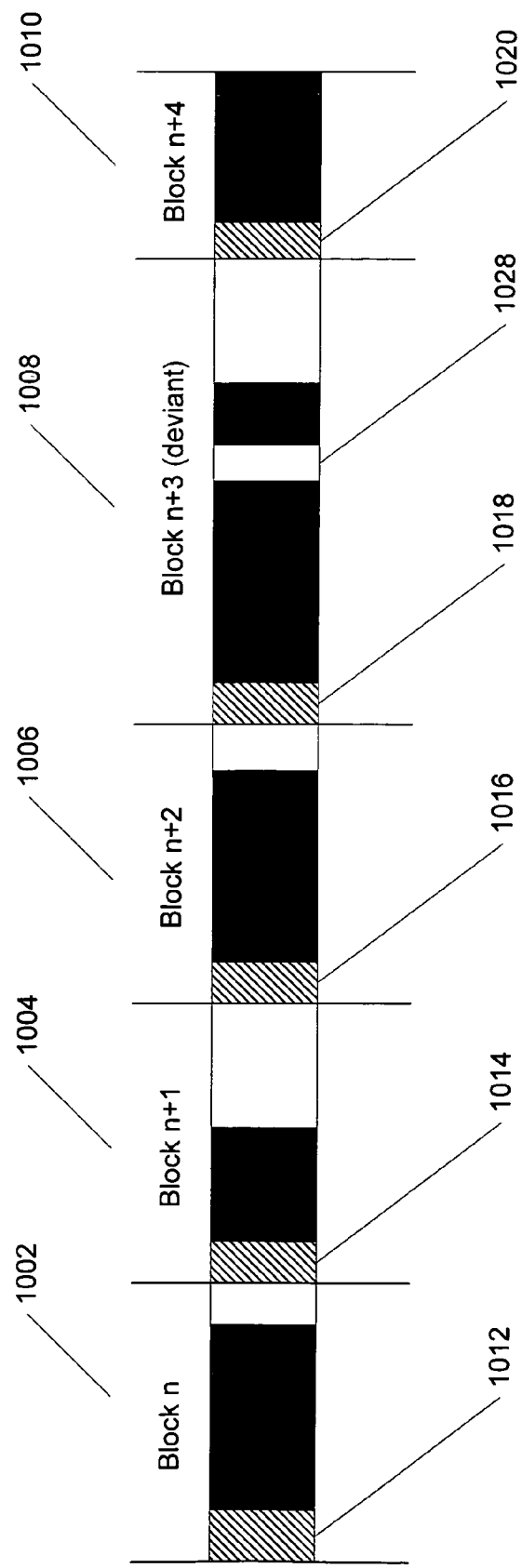
FIG. 12 illustrates one embodiment of the placement of blocks including a deviant block.

FIG. 12 illustrates one embodiment of the placement of blocks including a deviant block. Contiguous blocks n through n+4 are shown numbered 1002-1010 respectively. In the illustrated embodiment, block 1008 is deviant. Also shown are headers that are associated with and stored with each block. For example, blocks 1102, 1004, 1006, and 1010 are associated with headers 1012, 1014, 1016, and 1020, respectively. Deviant block 1008 is stored with a first header 1018 and a second header 1028. Header 1028 is stored at the location that would hold the header for the next block if block 1008 were not deviant. Accordingly, if block 1002, 1004, 1006, or 1008 is wanted, it may be found on the first try and its location verified by reading the associated header. However, if block 1010 is wanted, header 1028 may be read indicating that block 1010 has been displaced by a deviant block. Header 1028 may indicate the offset that must be added to determine the location of block 1010.

In a further embodiment, information about deviant blocks may be cached in a structure called a deviant block predictor (DBP). Caching information about recent block misses due to deviant blocks may reduce future block misses. The DBP may be implemented as an ordinary cache structure that can be indexed with the page address, the cluster address, or a combination thereof.

Figure 13:
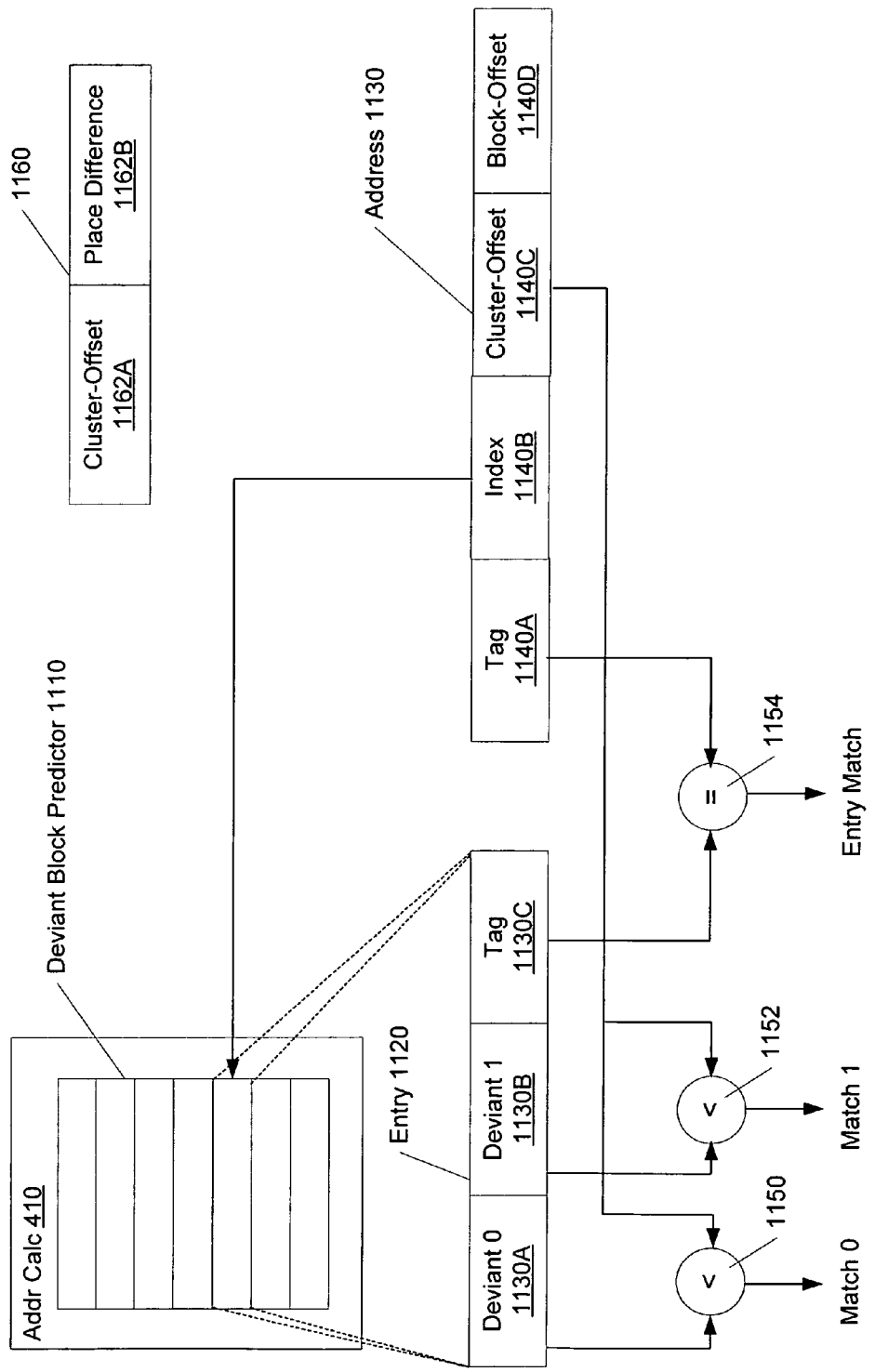
FIG. 13 illustrates one embodiment of a deviant block predictor (DBP).

FIG. 13 illustrates one embodiment of a DBP 1110. In the illustrated embodiment, a DBP entry 1120 and a target block address 1130 are shown. Each DBP entry corresponds to the occurrence of a block miss due to a deviant block. Entry 1120 may comprise a list of deviant blocks 1130A and 1130B as well as a tag 1130C. Although only two deviant blocks are indicated in entry 1120, fewer or more than two deviant blocks may exist in a given block cluster in which a block miss has occurred. Within entry 1120 data 1160 may be stored for each deviant block. Data 1160 may include a cluster offset 1162A and a place difference 1162B. Address 1130 may include a tag 1140A, an index 1140B, a cluster-offset 1140C, and a block offset 1140D. Also shown are three comparators 1150, 1152, and 1154 whose operation is described below.

In operation, index 1140B may point to entry 1120 in DBP 1110 via direct mapping. Alternatively, an associative structure may be used to index into DBP 1110. Once entry 1120 is identified, tag 1130C may be compared to tag 1140A by comparator 1154. If the tags do not match, no deviant block prediction is made.

If the tags match, at least one deviant block may be found in the target cluster. Entry 1120 may then be evaluated as follows. Cluster offset 1140C may be compared to the cluster offsets 1162A for each deviant block entry 1130A and 1130B by comparators 1150 and 1152 respectively. If cluster-offset 1140C is greater than cluster offset 1162A for a given deviant block, then the deviant block may affect the location of the target block. Thus, place difference 1162B for the deviant block with the maximum cluster-offset that is still less than the cluster offset for the target block is added to the uncorrected target block location to calculate the actual location of the target block.

Figure 14:
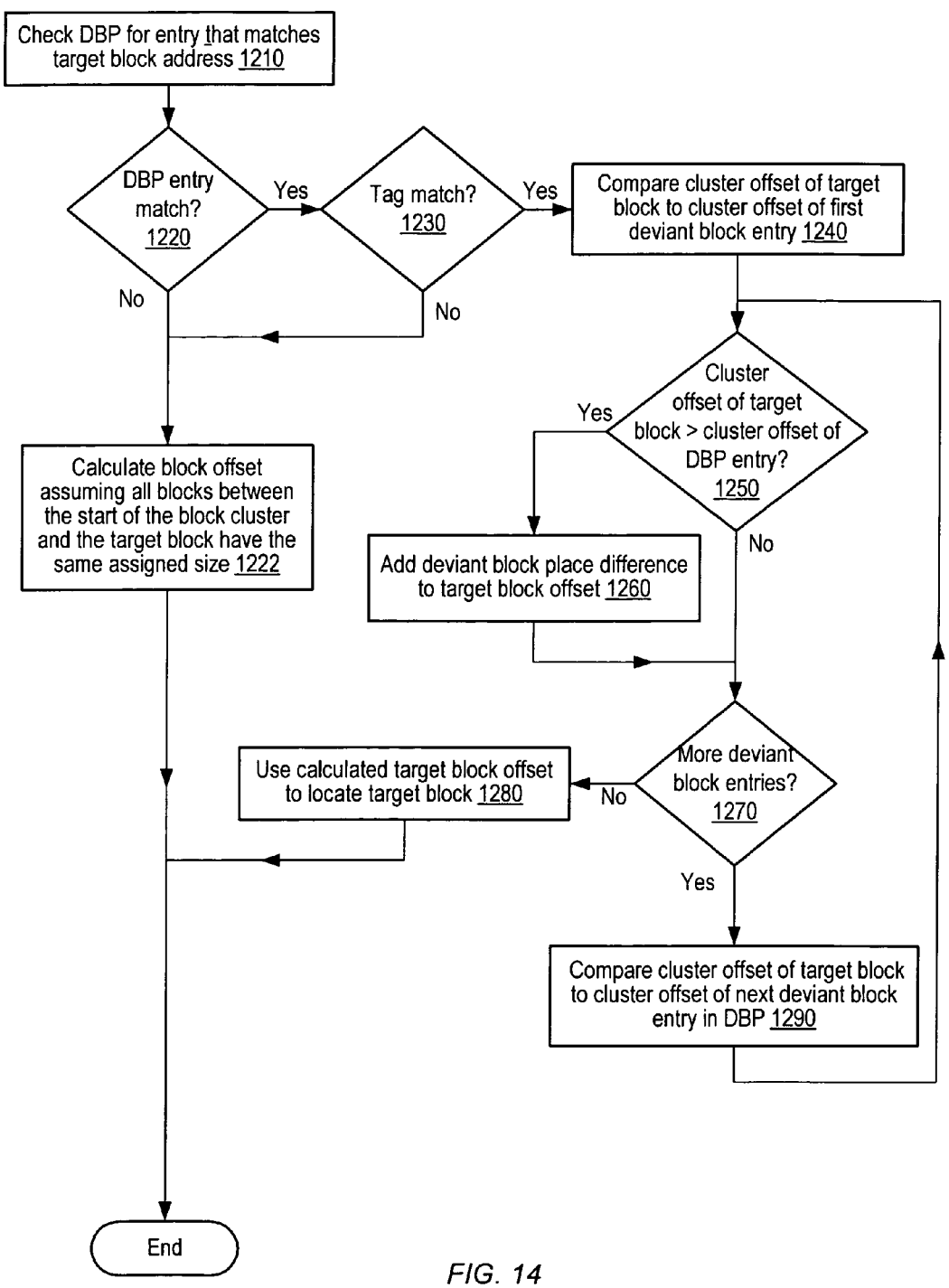
FIG. 14 illustrates one embodiment of a process that may be used to calculate the address of a target block using a DBP.

FIG. 14 illustrates one embodiment of a process 1200 that may be used to calculate the address of a target block using a DBP. Once a target sub-page has been located, process 1200 may be used to locate the target block within the sub-page. Entries in DBP 1110 may be checked to determine if the address of blocks in which a miss has occurred matches the target block address (1210). If no matches are found in DBP 1110 (decision block 1220), then the target block offset may be calculated by assuming that all blocks between the start of the block cluster and the target block have the same assigned size (1222). If a match is found in a DBP entry, then a tag in the target address may be compared to a tag in the DBP entry to verify that the DBP entry corresponds to the target block (decision block 1230). If the tags do not match, then the target block offset may be calculated by assuming that all blocks between the start of the block cluster and the target block have the same assigned size (1222).

If the tags match, then an adjustment to the target block offset may be calculated as follows. The cluster offset of the target block may be compared to the cluster offset of the first deviant block entry (1240). If the cluster offset of the target block is greater than the cluster offset of the first deviant block entry (decision block 1250), then the target block offset may be increased by an amount equal to the place difference 1162B found in the first deviant block entry (1260). Once the target block offset has been increased, or if the cluster offset of the target block is not greater than the cluster offset of the first deviant block entry, the DBP entry may be checked to see if there are any additional deviant blocks (1270). If additional deviant blocks are found, then the cluster offset of the target block may be compared to the cluster offset 1162A of the next deviant block (1290). If the cluster offset of the target block is greater than the cluster offset of the next deviant block entry (decision block 1250), then the target block offset may be increased by an amount equal to the place difference 1162B found in the next deviant block entry (1260). The preceding process may be repeated until a comparison of the cluster offset of the target block has been made with each of the deviant block entries in the DBP entry and the original target block offset has been increased by the sum of the place differences for all deviant blocks between the beginning of the cluster and the target block. The resulting target block offset, after any place differences have been added, may be used to locate the target block (1280).

In alternative embodiments, since the location of a target block may be confirmed by checking the header associated with the block, complete tag matching may be omitted. Rather than storing the cluster offset for each deviant block, in one alternative embodiment, the information saved in an entry in the cache structure may be the block number for the miss. When another block in the same cluster is targeted, and there is a matching entry in the DBP, the block number of the target block is compared with the block number in the matching entry. If the target block number is larger, the place difference stored in the entry is added to the originally predicted address and thereby the correct block may be located. To handle several deviant blocks within the same cluster there are a number of alternative embodiments. One is to use the block offset 1140D within the cluster for indexing or tag-matching, and another is to include information about more than one miss in each DBP entry.

Figure 15:
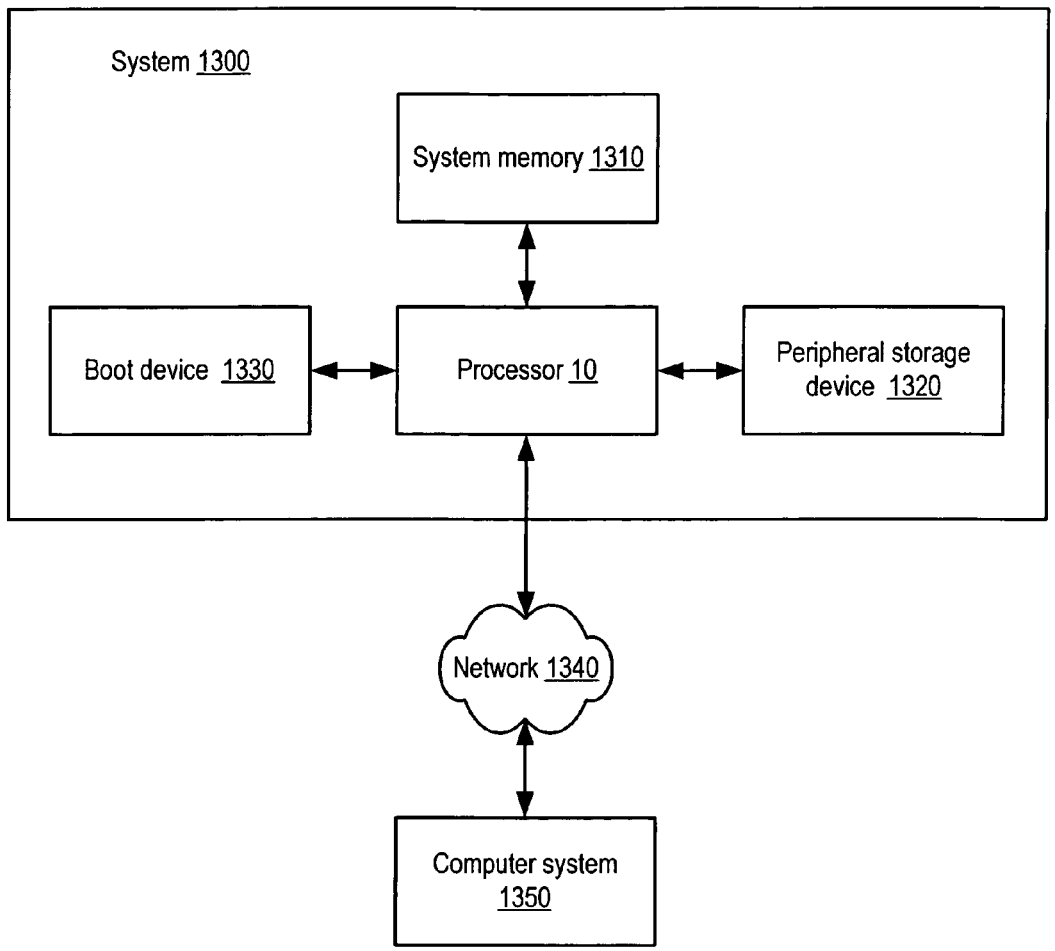
FIG. 15 illustrates one embodiment of a system including a processor.

One embodiment of a system including processor 10 is illustrated in FIG. 15. In the illustrated embodiment, system 1300 includes an instance of processor 10 coupled to a system memory 1310, a peripheral storage device 1320 and a boot device 1330. System 1300 is coupled to a network 1340, which is in turn coupled to another computer system 1350. In some embodiments, system 1300 may include more than one instance of the devices shown, such as more than one processor 10, for example. In various embodiments, system 1300 may be configured as a rack-mountable server system, a standalone system, or in any other suitable form factor. In some embodiments, system 1300 may be configured as a client system rather than a server system.

In various embodiments, system memory 1310 may comprise any suitable type of system memory as described above, such as FB-DIMM, DDR/DDR2 SDRAM, or RDRAM®, for example. System memory 1310 may include multiple discrete banks of memory controlled by discrete memory interfaces in embodiments of processor 10 configured to provide multiple memory interfaces 130. Also, in some embodiments system memory 1310 may include multiple different types of memory.

Peripheral storage device 1320, in various embodiments, may include support for magnetic, optical, or solid-state storage media such as hard drives, optical disks, nonvolatile RAM devices, etc. In some embodiments, peripheral storage device 1320 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 1330 may include a device such as an FPGA or ASIC configured to coordinate initialization and boot of processor 10, such as from a power-on reset state. Additionally, in some embodiments boot device 1330 may include a secondary computer system configured to allow access to administrative functions such as debug or test modes of processor 10.

Network 1340 may include any suitable devices, media and/or protocols for interconnecting computer systems, such as wired or wireless Ethernet, for example. In various embodiments, network 1340 may include local area networks (LANs), wide area networks (WANs), telecommunication networks, or other suitable types of networks. In some embodiments, computer system 1350 may be similar to or identical in configuration to illustrated system 1300, whereas in other embodiments, computer system 1350 may be substantially differently configured. For example, computer system 1350 may be a server system, a processor-based client system, a stateless "thin" client system, a mobile device, etc.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as a network and/or a wireless link. A carrier medium may also include storage media or memory media such as magnetic or optical media, e.g., disk or CD-ROM, volatile or non-volatile media such as RAM (e.g. SDRAM, RDRAM, SRAM, etc.), ROM, etc.

What is claimed is:

1. A computing system comprising:
a processor including at least one cache configured to store data;
a data storage unit configured to store one or more data blocks in a compressed format in fixed size units; and
a block size table (BST) comprising a plurality of entries;
wherein each entry of the BST comprises:
a first sequence of values, each of which represents a different size of a plurality of fixed sizes; and
a second sequence of values, each of which:
corresponds to a data block of the one or more data blocks stored in the data storage unit;
identifies a location in the first sequence of values; and
occurs in a same sequential order as a data block to which it corresponds;
wherein to determine a location of a target data block, the processor is configured to:
identify a first entry in the BST which corresponds to the target data block;
retrieve a first sequence of values and a second sequence of values from the first entry;
identify one or more consecutive values in the retrieved second sequence of values starting with a first location and ending with a location immediately preceding a location that corresponds to the target data block;
utilize the one or more consecutive values to identify corresponding locations in the first sequence of values;
compute a sum of sizes represented by values stored in each of the identified corresponding locations in the first sequence of values; and
add said sum to a base address of a target page including the target data block.

2. The system of claim 1, wherein in identifying the first entry in the BST, the processor is configured to identify a target page that includes the target data block; and identify a BST entry which corresponds to the target page.

3. The system of claim 2, further comprising a compression/decompression unit configured to:
compress data to be stored in the data storage unit; and
decompress data to be stored in the cache.

4. The system of claim 1, wherein to determine a size represented by a given value of the consecutive values, the processor is configured to use the given value to identify a particular location in first sequence of values, and retrieve a value indicative of a size stored in the particular location.

5. The system of claim 4, wherein each block size entry further comprises one or more sub-page size values, and wherein in response to said miss, the processor is further configured to:
identify a target sub-page that includes the target data block;
retrieve from the first entry a sequence of values comprising a mapping of sub-page size values to sub-page sizes; and
compute a sum of sub-page sizes from a first sub-page of the target page to a sub-page immediately preceding the target sub-page.

6. The system of claim 5, wherein in response to a request to write back a given data block previously stored in a first fixed size unit, the processor is configured to:
compress the given data block;
determine a new block size in which the compressed given data block can be stored;
if the new block size is a same size as a size of the first fixed size unit, write the compressed given data block back to a unit of the first fixed size; and
if the new block size is not the same size as the first fixed size unit, write the compressed given data block to a fixed size unit which is different than the first fixed size unit.

7. The system of claim 4, wherein the plurality of data blocks are stored as groups of clusters, each cluster comprising one or more data blocks contiguously stored in a given fixed size unit, and wherein calculating said aggregate size of data blocks from the first block in the target page to the block immediately preceding the target data block comprises summing the aggregate size of the clusters from the first cluster of the target page to a cluster immediately preceding a cluster which contains the target data block.

8. The system of claim 4, wherein the plurality of data blocks are stored as groups of clusters, each cluster comprising one or more contiguously stored data blocks; wherein each of said one or more data blocks except for a pre-determined number of large data blocks is stored in units of a given fixed size, and the large data blocks are stored in units larger than the given fixed size; and
wherein each block size value indicates the size of the given fixed size unit of a respective one of the one or more clusters.

9. A method comprising:
storing one or more data blocks in a compressed format in fixed size units;
storing a plurality of block size entries in a block size table (BST), wherein each entry of the BST comprises:
a first sequence of values, each of which represents a different size of a plurality of fixed sizes; and
a second sequence of values, each of which:
corresponds to a data block of the one or more data blocks stored in the data storage unit;
identifies a location in the first sequence of values; and
occurs in a same sequential order as a data block to which it
corresponds;
wherein to determine a location of a target data block, the method comprises:
identifying a first entry in the BST which corresponds to the target data block;
retrieving a first sequence of values and a second sequence of values from the first entry;
identifying one or more consecutive values in the retrieved second sequence of values starting with a first location and ending with a location immediately preceding a location that corresponds to the target data block;
utilizing the one or more consecutive values to identify corresponding locations in the first sequence of values;
computing a sum of sizes represented by values stored in each of the identified corresponding locations in the first sequence of values; and
adding said sum to a base address of a target page including the target data block.

10. The method of claim 9, wherein identifying the first entry in the BST further comprises:
identifying a target page that includes the target data block; and identifying a BST entry which corresponds to the target page.

11. The method of claim 10, further comprising:
compressing data to be stored; and
decompressing retrieved data.

12. The method of claim 9, wherein determining a size represented by a given value of the consecutive values comprises using the given value to identify a particular location in first sequence of values, and retrieving a value indicative of a size stored in the particular location.

13. The method of claim 12, wherein each block size entry further comprises one or more sub-page size values, and wherein in response to said detecting a request to access a target data block, the method further comprises:
identifying a target sub-page that includes the target data block;
retrieving from the first entry a size vector comprising a mapping of sub-page size values to sub-page sizes; and
summing sub-page sizes from the first sub-page of the target page to the sub-page immediately preceding the target sub-page.

14. The method of claim 13, further comprising in response to a request to write back a given data block previously stored in a first fixed size unit:
compressing the given data block;
determining a new block size in which the compressed given data block can be stored;
if the new block size is the same size as the size of the first fixed size unit, writing the target data block back to the first fixed size unit; and
if the new block size is not the same size as the first fixed size unit, writing the compressed given data block to a fixed size unit which is different than the first fixed size unit.

15. The method of claim 12, further comprising storing a plurality of data blocks as groups of clusters, each cluster comprising one or more data blocks contiguously stored in a given fixed size unit; wherein calculating the aggregate size of data blocks from the first block in the target page to the block immediately preceding the target data block comprises summing the aggregate size of the clusters from the first cluster of the target page to the cluster immediately preceding the cluster which contains the target data block.

16. The method of claim 12, further comprising storing a plurality of data blocks as groups of clusters, each cluster comprising one or more contiguously stored data blocks, wherein each of said one or more data blocks except for a pre-determined number of large data blocks is stored in units of a given fixed size, and the large data blocks are stored in units larger than the given fixed size; and wherein each block size value indicates the size of the given fixed size unit of a respective one of the one or more clusters.

17. A processor comprising:
a cache configured to store one or more data blocks;
a block size table (BST) comprising a plurality of entries, wherein each entry of the BST comprises:
a first sequence of values, each of which represents a different size of a plurality of fixed sizes; and
a second sequence of values, each of which:
corresponds to a data block of the one or more data blocks stored in the cache;
identifies a location in the first sequence of values; and
occurs in a same sequential order as a data block to which it corresponds;
wherein to determine a location of a target data block, the processor is configured to:
identify a first entry in the BST which corresponds to the target data block;
retrieve a first sequence of values and a second sequence of values from the first entry;
identify one or more consecutive values in the retrieved second sequence of values starting with a first location and ending with a location immediately preceding a location that corresponds to the target data block;
utilize the one or more consecutive values to identify corresponding locations in the first sequence of values;
compute a sum of sizes represented by values stored in each of the identified corresponding locations in the first sequence of values; and
add said sum to a base address of a target page including the target data block.

18. The processor of claim 17, wherein in identifying the first entry in the BST, the processor is configured to identify a target page that includes the target data block; and identify a BST entry which corresponds to the target page.

19. The processor of claim 18, further comprising a compression/decompression unit configured to:
compress data to be stored in the data storage unit; and
decompress data to be stored in the cache.

20. The processor of claim 17, wherein to determine a size represented by a given value of the consecutive values, the processor is configured to use the given value to identify a particular location in first sequence of values, and retrieve a value indicative of a size stored in the particular location.

* * * * *